US007284228B1

(12) United States Patent
Haratsaris

(10) Patent No.: US 7,284,228 B1
(45) Date of Patent: Oct. 16, 2007

(54) METHODS OF USING ANT COLONY OPTIMIZATION TO PACK DESIGNS INTO PROGRAMMABLE LOGIC DEVICES

(75) Inventor: Philip R. Haratsaris, Longmont, CO (US)

(73) Assignee: Xilinx, Inc., San Jose, CA (US)

( * ) Notice: Subject to any disclaimer, the term of this patent is extended or adjusted under 35 U.S.C. 154(b) by 206 days.

(21) Appl. No.: 11/184,452

(22) Filed: Jul. 19, 2005

(51) Int. Cl.
*G06F 17/50* (2006.01)
*H03K 17/693* (2006.01)

(52) U.S. Cl. ....................................... 716/16

(58) Field of Classification Search .................... 716/2, 716/5, 12, 16
See application file for complete search history.

(56) References Cited

U.S. PATENT DOCUMENTS

| 5,963,050 | A | 10/1999 | Young et al. |
| 6,363,517 | B1 | 3/2002 | Levi et al. |
| 6,363,519 | B1 | 3/2002 | Levi et al. |
| 6,378,122 | B1 | 4/2002 | Levi et al. |
| 6,430,736 | B1 | 8/2002 | Levi et al. |
| 6,539,532 | B1 | 3/2003 | Levi et al. |

OTHER PUBLICATIONS

Sarif, Bambang; Modified Ant Colony Algorithm For Combinational Logic Circuits Design; 2003; All pages.*
Scheuermann, B.; FPGA Implementation of Population-Based Ant Colony Optimization; 2004; All pages.*
Marco Dorigo et al.; "Ant Colonies for the Traveling Salesman Problem"; published in BioSystems, 1997; available on the web at http://dsp.jpl.nasa.gov/members/payman/swarm/dorigo97-bs.pdf; pp. 1-10.
James Montgomery; "Towards a Systematic Problem Classification Scheme for Ant Colony Optimisation"; Aug. 30, 2002; available on the web at http://www.it bond.edu.au/publications/02TR/02-15.pdf; pp. 1-12.
Gang Wang et al.; "Application Partitioning on Programmable Platforms Using the Ant Colony Optimization"; IEEE.tex, v 1.7; Jan. 6, 2004; pp. 1-23.
Dorian Gaertner; "Natural Algorithms for Optimisation Problems: Final Year Project Report"; Jun. 20, 2004; available on the web at http://www.doc.ic.ac.uk/teaching/projects/Distinguished04/DorianGaertner.pdf; pp. 1-129.

(Continued)

*Primary Examiner*—Paul Dinh
*Assistant Examiner*—Suresh Memula
(74) *Attorney, Agent, or Firm*—Lois D. Cartier

(57) ABSTRACT

Methods of packing a design into a programmable logic device (PLD) using ant colony optimization. An augmented graph is assigned to the design, e.g., nodes and edges are defined based on sub-circuits and interconnections in the design, and a topological order is assigned to the nodes. An equation is determined for probabilistic behavior of packing agents at each node, and an initial pheromone value is assigned to each edge. In each iteration, each of "M" packing agents makes a tour of the graph, with merging decisions being made at each node in a probabilistic manner determined by the equation and pheromone values. The M resulting packing implementations are scored, and the best packing implementation is used to change the pheromone values for the next iteration. The probabilistic equation and scoring can be based on timing, area, and/or power constraints, for example. The process is complete when predefined criteria are met.

15 Claims, 5 Drawing Sheets

OTHER PUBLICATIONS

Gang Wang et al.; "System Level Partitioning for Programmable Platforms Using the Ant Colony Optimization"; downloaded from http://www.athena.ece.ucsb.edu/~gang/papers/iwls2004.pdf on July 11, 2005; pp. 1-8.

Xilinx, Inc.; "Constraints Guide"; V9.1l; Copyright 1995-2007; available from www.xilinx.com; pp. 88-89, 115-116, 120-123, 135-138, 209-211, 214-216, 221-240, 247-255, 270-271, 337-377, and 388-389.

* cited by examiner

Key: Figs. 6-13

METHODS OF USING ANT COLONY OPTIMIZATION TO PACK DESIGNS INTO PROGRAMMABLE LOGIC DEVICES

FIELD OF THE INVENTION

The invention relates to implementation software for programmable integrated logic devices (PLDs). More particularly, the invention relates to methods of packing designs into PLDs.

BACKGROUND OF THE INVENTION

Programmable logic devices (PLDs) are a well-known type of integrated circuit that can be programmed to perform specified logic functions. One type of PLD, the field programmable gate array (FPGA), typically includes an array of programmable tiles. These programmable tiles can include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output (I/O) resources by an interconnect switch matrix. Each function block of the CPLD includes a two-level AND/OR structure similar to those used in Programmable Logic Arrays (PLAs) and Programmable Array Logic (PAL) devices. In CPLDs, configuration data is typically stored on-chip in non-volatile memory. In some CPLDs, configuration data is stored on-chip in non-volatile memory, then downloaded to volatile memory as part of an initial configuration sequence.

For all of these programmable logic devices (PLDs), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

FIG. 1 is a simplified illustration of an exemplary FPGA. The FPGA of FIG. 1 includes an array of configurable logic blocks (LBs 101a-101i) and programmable input/output blocks (I/Os 102a-102d). The LBs and I/O blocks are interconnected by a programmable interconnect structure that includes a large number of interconnect lines 103 interconnected by programmable interconnect points (PIPs 104, shown as small circles in FIG. 1). PIPs are often coupled into groups (e.g., group 105) that implement multiplexer circuits selecting one of several interconnect lines to provide a signal to a destination interconnect line or logic block. As noted above, some FPGAs also include additional logic blocks with special purposes (not shown), e.g., DLLs, block RAM, and so forth.

A PLD interconnect structure can be complex and highly flexible. For example, Young et al. describe the interconnect structure of an exemplary FPGA in U.S. Pat. No. 5,963,050, issued Oct. 5, 1999 and entitled "Configurable Logic Element with Fast Feedback Paths", which is incorporated herein by reference in its entirety. Young et al. describe various types of interconnect lines, including general interconnect lines that programmably interconnect two or more different logic blocks, and fast feedback interconnect lines that interconnect lookup table (LUT) output terminals with input terminals of the same LUT and of other LUTs in the same logic block.

FIG. 2 is a block diagram of a logic block in a typical FPGA, and illustrates an exemplary fast feedback path. Logic block 200 of FIG. 2 includes an input multiplexer (IMUX) 201, two slices 202A, 202B of programmable logic driven by the input multiplexer, an output multiplexer (OMUX) 204, and three-state buffers 205, all coupled together as shown in FIG. 2. In exemplary logic block 200, each slice includes two lookup tables (LUTS) 203A-203D. LUT input signals are provided by input multiplexer 201. Several output signals from each slice, including the LUT output signals, are provided to output multiplexer 204. The LUT output signals, in addition to driving the output multiplexer, are also provided back to input multiplexer 201 via fast feedback paths 206.

For example, fast feedback path 206A is provided from the LUT output of LUT 203A back to input multiplexer 201. Within the input multiplexer, a signal on fast feedback path 206A can access any of three LUT input terminals, e.g., one input terminal of LUT 203B, one of LUT 203C, and one of LUT 203D.

Additional examples of fast feedback paths are shown, for example, in FIG. 13 of U.S. Pat. No. 5,963,050, referenced above.

Fast feedback paths provide a fast interconnection between two LUTs. Therefore, fast feedback paths can be used to reduce path delays for signal paths traversing more than one LUT between registers. FIGS. 3 and 4 illustrate a known method by which LUTs can be "packed" into slices, such that path delays are reduced by using fast feedback paths. This known packing method addresses only fast feedback paths between the two LUTs of each slice, and does not consider fast feedback paths between slices. Therefore, the packing method illustrated in FIGS. 3 and 4 assumes that the longest available fast feedback path interconnects only two LUTs.

FIGS. 3 and 4 show seven LUTs A-G, and the interconnections between these LUTs in an exemplary design to be implemented in a PLD having two LUTs per slice. The structures shown in FIGS. 3 and 4 are known as "graphs". Each node A-G of a graph represents a LUT, and the arrows represent "edges" in the graph, in this case interconnections between the LUTs.

In the implementation shown in FIG. 3, LUT pairs A&B, C&D, and E&F are interconnected using fast feedback paths, or "fast paths" (solid arrows). LUT pairs B&D, D&E, and F&G are interconnected using feedback paths other than fast feedback paths, or "slow paths" (dashed arrows). Clearly, the longest signal path in this example traverses LUTs A, B, D, E, F, and G, and includes two fast paths and three slow paths. If the delay of a fast path is "f", and the delay of a slow path is "s", the longest path delay in this exemplary graph is "3s+2f" (3 times s plus 2 times f).

FIG. 4 shows an alternative implementation of the same circuit, in which improved packing reduces the overall delay of the longest signal path. In the implementation of FIG. 4, LUT pairs A&B, D&E, and F&G are interconnected using fast paths, and LUT pairs C&D, B&D, and E&F are interconnected using slow paths. Thus, the longest path delay in the exemplary graph of FIG. 4 is "2s+3f". The delay of the longest path is less than that of FIG. 3 by a delay of "s−f" (s minus f).

This example illustrates that in the delay based packing problem, a locally best solution (e.g., packing LUTs C&D into the same slice, as in FIG. 3) can result in a sub-optimal global solution (e.g., compared to the solution of FIG. 4).

Clearly, it is desirable to provide a method of determining packing in a PLD that provides a globally desirable solution, and not just a locally desirable one. One such method currently in use utilizes linear scans of a topologically sorted Directed Acyclic Graph (DAG) (e.g., such as those in FIGS. 3 and 4) to pack LUTs into slices based on maximizing the use of fast paths. A forward estimation of arrival times plus a reverse traversal yields slack values that identify the longest paths. A visit of each node in reverse topological order and ordered by worst slack drives the packing. Note that this approach utilizes graphs similar to those shown in FIGS. 3 and 4, and approaches the packing problem from the viewpoint already presented, that of identifying the longest path and packing the nodes on the longest path to maximize the use of fast paths on this path.

However, identifying the longest path and addressing delays on that path might or might not address the needs of the PLD user. For example, the longest path is not necessarily the most critical path in a user design, because some paths have no effect on the maximum operating frequency of a design. Therefore, it is desirable to provide a method of packing a design into a PLD that addresses the overall packing problem, rather than simply addressing the longest paths in the design.

SUMMARY OF THE INVENTION

The invention provides methods of packing a design into a programmable logic device (PLD) using ant colony optimization. The methods apply ant colony optimization to an augmented Directed Acyclic Graph (DAG) to make packing decisions, rather than using a DAG to perform path finding, as in known methods. An augmented graph is assigned to the design, e.g., nodes and edges are defined based on sub-circuits and interconnections in the design, and a topological order is assigned to the nodes. An equation is determined for probabilistic behavior of packing agents ("ants") at each node in the augmented graph, and an initial pheromone value is assigned to each edge in the augmented graph. In each iteration of the packing optimization process, M packing agents are applied to a first node in the topological order, where M is an integer. Each of the M packing agents makes a tour of the graph, with merging decisions relative to preceding nodes being made at each node. The merging decisions are made in a probabilistic manner determined by the previously determined equation and the current pheromone value. The result is M packing implementations of the design in the PLD.

The M packing implementations are scored, and the top-scoring packing implementation is used to change the pheromone values for the next iteration. Pheromone values are increased for edges included in the top-scoring packing implementation, and, optionally, pheromone values are decreased for edges that are not included in the top-scoring packing implementation. Thus, the top-scoring packing implementation from each iteration provides feedback to improve the likelihood of future packing agents making the same packing decisions (i.e., merged or not merged), and reduce the likelihood of repeating poor packing decisions. However, the probabilistic nature of each packing decision allows the tours to escape local minima or maxima that are nevertheless detrimental to the overall result.

Nodes in the augmented graph can be LUTs, slices, or other programmable sub-circuits in the PLD. Edges can be merged or non-merged interconnections between the nodes, for example, or fast paths and slower paths. For example, when an augmented graph is defined such that nodes are LUTs, an edge can be either a merged edge (e.g., packing the LUTs at either end of the edge into a single slice) or a non-merged edge (e.g., placing the two LUTs at either end of the edge into two different slices). The probabilistic equation and the scoring can be based on timing constraints, area constraints, power constraints, or other considerations. In some embodiments, more than one type of constraint is taken into account in the probabilistic equation and/or the scoring.

The invention also provides media that store code for performing the methods of the invention, and computer systems for executing these methods.

BRIEF DESCRIPTION OF THE DRAWINGS

The present invention is illustrated by way of example, and not by way of limitation, in the following figures.

DETAILED DESCRIPTION OF THE DRAWINGS

The present invention is applicable to a variety of programmable logic devices (PLDs). The present invention has been found to be particularly applicable and beneficial for PLDs including logic blocks comprising slices made up of two or more lookup tables (LUTs). However, the present invention is not so limited. For example, the invention can be applied to virtually any PLD including two or more levels of programmable logic, including but not limited to logic blocks, slices, and LUTs.

Ant colony optimization is a well-known algorithm based on the ethological study of ant behavior. Ants have the capability to establish the optimal path between their colony and a food source within a relatively short period of time. Ants deposit a certain amount of pheromone while walking, and each ant probabilistically prefers to follow a path rich in pheromone. A collective autocatalytic (positive feedback) behavior emerges as more ants choose the shortest paths, which in turn creates an even larger amount of pheromone on these paths.

Ant colony optimization has been applied to practical problems such as the traveling salesman problem, vehicular traffic, data mining, network routing, and hardware/software co-design. A method has now been developed that permits the application of ant colony optimization to the process of packing a design into programmable logic elements (sub-circuits) in a PLD. By applying ant colony optimization to the packing process, an overall optimal (or close to optimal) solution can be achieved, rather than addressing only the longest paths, as in known packing methods.

Figure 5:
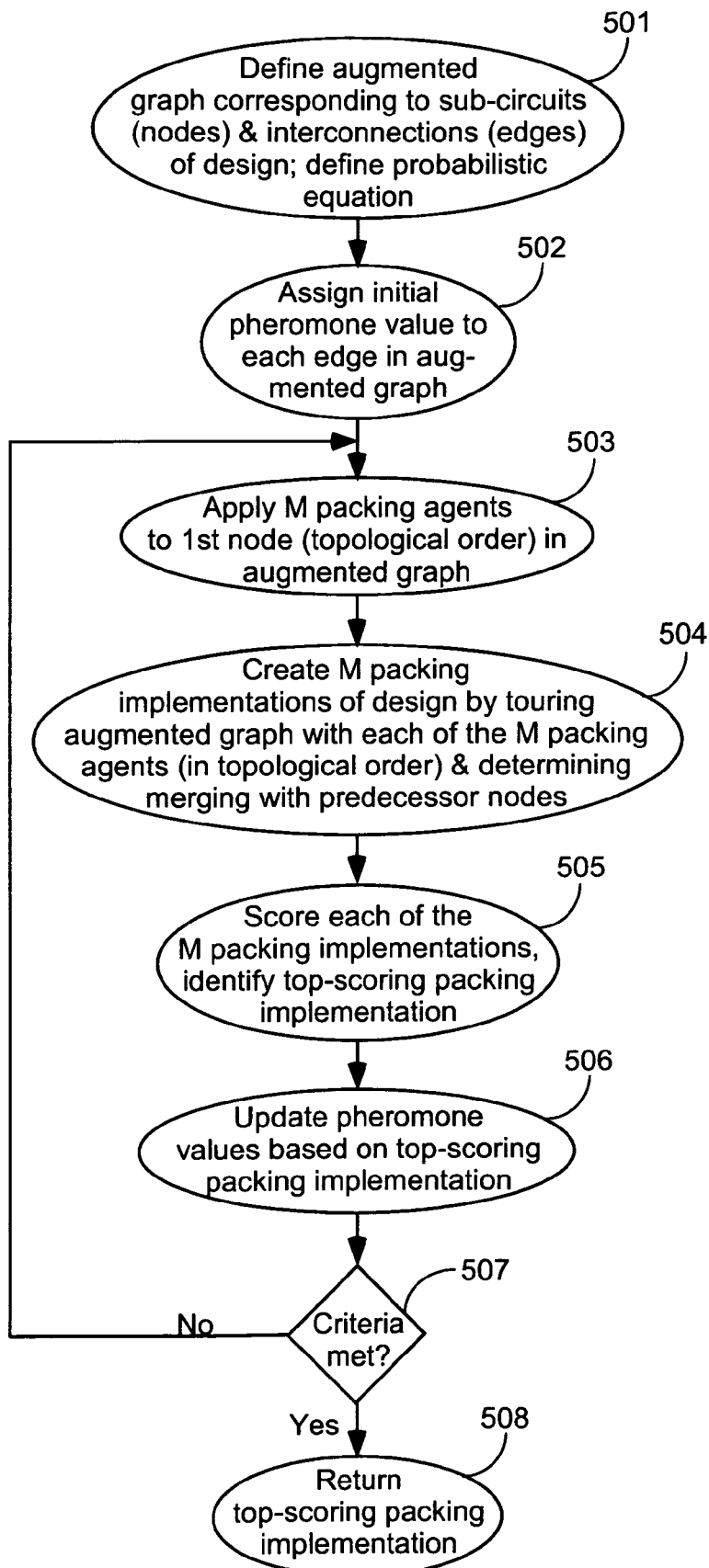
FIG. 5 illustrates the steps of a novel method of packing a design into a PLD.

FIG. 5 illustrates the steps of a novel method of packing a design into a PLD. In step 501, an augmented graph (e.g., an augmented Directed Acyclic Graph (DAG)) and probabilistic equation are defined for the design. The augmented graph is used to model the netlist connectivity of the design, while the probabilistic equation describes the behavior of the packing agents at each node in the graph.

Figure 6:
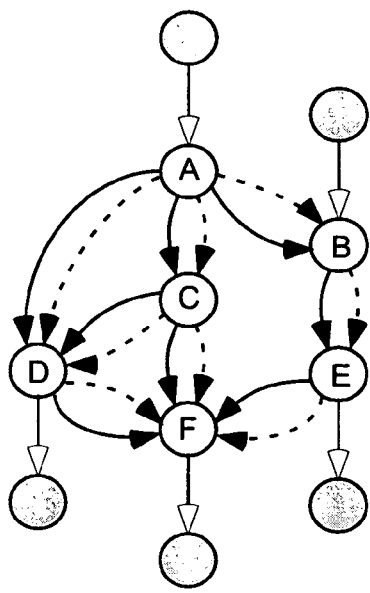
FIG. 6 shows an augmented Directed Acyclic Graph (DAG) for an exemplary design in an exemplary PLD.

FIG. 6 provides a simple example of an augmented graph that can be used to generate packing implementations of designs in PLDs. (A typical PLD design includes many more nodes and edges than the graph illustrated in FIG. 6, but a simpler graph is used as an example, for clarity. It will be clear to those of skill in the art that the principles and examples included herein can be extended to apply to larger and more complex graphs.) Each node in the graph corresponds to a sub-circuit of the design. The sub-circuits of the design are defined to correspond to an amount of logic that can be fitted into one programmable unit in the PLD. For example, in an exemplary PLD including an array of 4-input LUTs, one sub-circuit can correspond to an amount of logic that will fit into one 4-input LUT. In another example, one sub-circuit corresponds to an amount of logic that will fit into one slice, where one slice can include two LUTs or four LUTs, for example. In the exemplary graph of FIG. 6, each node corresponds to a sub-circuit that will fit into one LUT with four input terminals and a single output terminal.

Each edge (arrow) in the graph corresponds to an interconnection between the two sub-circuits corresponding to the two nodes at either end of the edge. Each graph includes at least two kinds of edges. For example, the graph of FIG. 6 includes a first group of edges (arrows made with solid lines) corresponding to an interconnection made between two LUTs in the same slice. In some PLDs, this interconnection can be made using a fast feedback path. A second group of edges (arrows made with dashed lines) correspond to interconnections made between LUTs in different slices. Note that the graph of FIG. 6 can equally well be applied to LUTs and logic blocks, or slices and logic blocks, instead of to LUTs and slices as in the present example.

Each node in the graph of FIG. 6 has an assigned letter, A-F. These letters show a topological order for the graph. A is the first node in the topological order. Node B follows node A, node C follows node B, and so forth. In a topological ordering, no node occurs before the node driving it. For example, node D is driven only by nodes A and C, both of which precede node D in the topological order.

The probabilistic equation will determine the probability that a packing agent (an "ant") will select each of the edges ("paths") leading from one node to the next. For example, for the design to work properly, one edge must be selected between each of the node pairs connected by edges in the graph of FIG. 6. Either the solid edge or the dashed edge must be selected, and there is a certain probability of selection associated with each edge. At least two factors determine when a given edge will be selected: the probabilistic equation; and an amount of "pheromone" (a pheromone value) associated with the edge. The higher the pheromone value, the higher the probability that the edge having the pheromone value will be selected. The probabilistic equation can be slanted to favor, for example, nodes that lie on longer paths, as well as nodes with a higher pheromone value. In some embodiments, the probabilistic equation takes into account which edges were selected by other packing agents during the same iteration. In other embodiments, results from the other packing agents in the same iteration are ignored. All nodes can have the same probabilistic equation, each node can have a different probabilistic equation, or some nodes can have the same probabilistic equation while others are different.

In one embodiment, each edge is initially assigned the same amount of pheromone (step 502 of FIG. 5). The amount of pheromone (the pheromone value) assigned to the various edges will be changed as the procedure progresses, and will affect the results of future packing implementations.

Repeated iterations are then performed on the graph. In each iteration, M packing agents are applied to the first node in the graph (step 503), where M is an integer greater than or equal to one. The first node is the first in the topological order, e.g., starting with node A in FIG. 6. Each of the M packing agents then tours the graph in topographical order (step 504). At each node, a decision is made whether or not to merge with each preceding node, based on the probabilistic equation and on the current pheromone values.

Each packing agent obeys a set of packing constraints, which can be included in the probabilistic equation, if desired. For example, in the present example where only two LUTs are included in a slice, each node can merge with at most one preceding node. For example, node D in FIG. 6 can merge with either node A or node C, or neither, but not with both nodes A and C. Other packing constraints can include, for example, compliance with location constraints optionally included in the design.

In some embodiments, all of the packing agents are of the same type, e.g., all packing agents use the same probabilistic equation. In other embodiments, more than one type of packing agent is used. For example, some packing agents can use a probabilistic equation that favors higher-speed packing decisions, while other packing agents use a probabilistic equation that favors minimal area.

The result of the M tours is M packing implementations.

Figure 7:
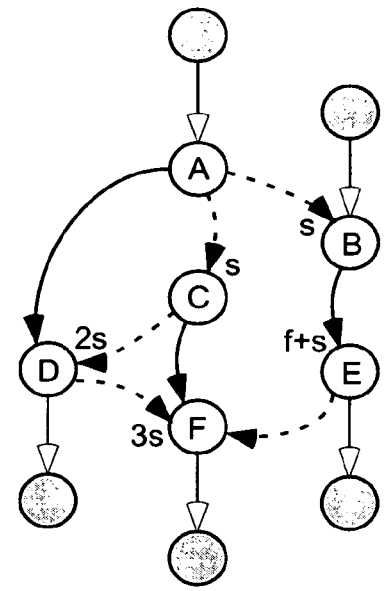
FIG. 7 shows a first packing implementation that can result from applying ant colony optimization to the augmented graph (augmented DAG) of FIG. 6.
Figure 8:
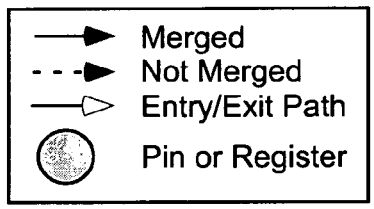
FIG. 8 shows a second packing implementation that can result from applying ant colony optimization to the augmented graph of FIG. 6.
Figure 8:
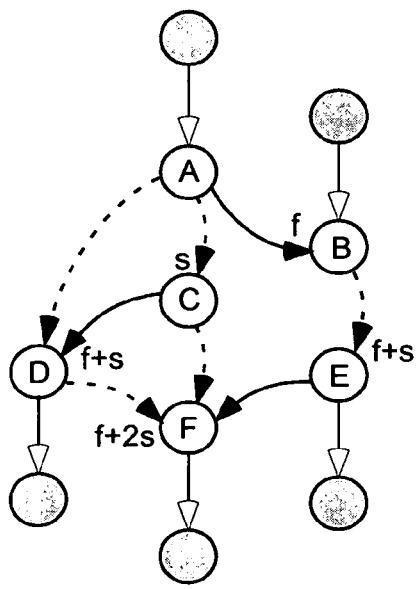
Figure 9:
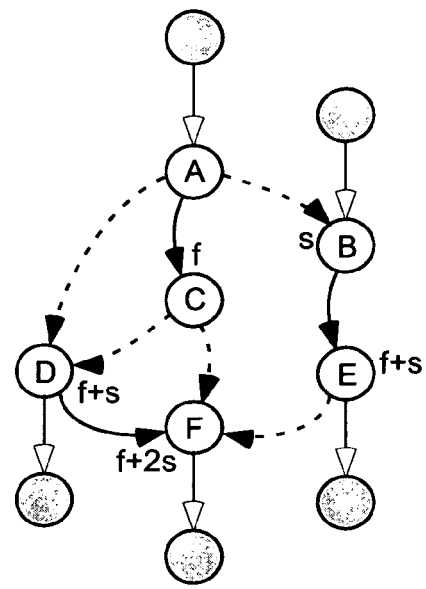
FIG. 9 shows a third packing implementation that can result from applying ant colony optimization to the augmented graph of FIG. 6.

For example, FIGS. 7-9 show three exemplary packing implementations that can result from applying steps 503 and 504 to the graph of FIG. 6. In this example, as previously described, the PLD includes two LUTs in each slice, each node of the graph corresponds to the logic implemented in one LUT, and each edge corresponds to either a merge (solid arrow) or a non-merge (dashed arrow). Because no more than two nodes (LUTs) can be assigned to each slice in this PLD, there can be no more than one solid arrow coupled to each node. (If a node had two solid arrows, that would indicate at least three nodes were assigned to one slice.) In the packing implementation of FIG. 7, nodes A and D are merged (packed into a single slice), nodes B and E are merged, and nodes C and F are merged. The longest path from the first node in the topological order, A, to the last node in the topological order, F, has a delay of "3s", where "s" is the non-merged delay.

FIG. 8 shows a different packing implementation, in which nodes A and B are merged, C and D are merged, and E and F are merged. The longest path from node A to node F in FIG. 8 has a delay of f+2s, where "f" is the merged delay and "s" is the non-merged delay. Depending on the timing constraints of the design, the packing implementation of FIG. 8 is likely to result in a faster design than the packing implementation of FIG. 7.

FIG. 9 shows a third packing implementation, in which nodes A and C are merged, B and E are merged, and D and F are merged. The longest path from node A to node F in FIG. 9 has a delay of f+2s, the same delay as the packing implementation of FIG. 8. Depending on the timing constraints and loading, the packing implementation shown in FIG. 9 might or might not result in a faster design than the packing implementation of FIG. 8. For example, if the edge between nodes B and E has a very tight timing constraint, the packing implementation of FIG. 9 is likely to be faster than the packing implementation of FIG. 8. Note that the probabilistic equation can be different at different nodes, to accommodate differences in timing constraints and loading.

Once M packing implementations have been produced, the M packing implementations are scored to determine the "best" of the M packing implementations (step 505 of FIG. 5). The definition of "best" can be determined based on various factors. For example, the top-scoring packing implementation can be the packing implementation that would result in the highest operating frequency, or the smallest area. The top-scoring packing implementation can also be selected based on a combination of speed and area, e.g., the fastest implementation that will fit within a certain predetermined area. Other factors can also be used to determine the scoring, e.g., low power consumption could be allowed to improve the scoring of a packing implementation.

Note that steps 503-505 can be performed individually in the order shown (all M packing implementations created, followed by all M packing implementations scored, for example), or simultaneously for each of the M packing agents (all M packing implementations created and scored simultaneously or at overlapping times, for example).

Once the top-scoring packing implementation has been selected, the pheromone values for the edges in the graph are updated to reflect the edges used in the top-scoring packing implementation (step 506). For example, pheromone values can be increased for edges used in the top-scoring packing implementation. Optionally, pheromone values can be decreased for edges not used in the top-scoring packing implementation. This change in the pheromone values serves to increase the odds that a previously successful edge selection will be followed again, while decreasing the odds of selecting an unsuccessful edge. However, the selection process remains probabilistic, so the process can still escape local minima or maxima that might prevent the process from finding a globally preferred solution.

After updating the pheromone values, the exit criteria are examined (step 507) to determine whether or not another iteration should be performed, e.g., whether or not another M packing agents should be applied to the graph to produce another M packing implementations. The exit criteria can be based on the quality of the result, for example, the score allotted to the top-scoring implementation, whether or not the top-scoring implementation provides an operating frequency meeting the design requirements, and/or whether or not the top-scoring implementation fits within the defined area. Additionally or alternatively, the exit criteria can be based on other factors, such as the amount of time that has elapsed since beginning the packing process.

In one embodiment, scoring is based on the timing of the resulting packing implementation. During each tour, the packing agent records worst case delay information for each edge. A new packing implementation is scored more highly than the best previous solution if: 1) the sum of all delays at the sink nodes (the nodes not driving any other nodes) is less than in the best previous solution; 2) no total delay of any timing-critical path is greater than in the best previous solution; and 3) the new packing implementation does not incur any new timing errors (previously non-negative slack values changing to negative slack values). Note that a slack value for a path is the maximum amount of time allocated for traversing the path minus the actual or estimated delay through the path. Therefore, a negative slack means that the delay through the path exceeds the amount of time allocated for traversing the path. Hence, a negative slack value is undesirable.

In another embodiment, the scoring is based on the area of the resulting packing implementation. For example, a packing implementation utilizing 40 slices in a PLD would be scored higher than a packing implementation utilizing 41 slices.

If the exit criteria are not met, another iteration of steps 503-507 is performed. If the exit criteria are met, the top-scoring packing implementation is returned as being the "best" packing implementation.

Figure 10:
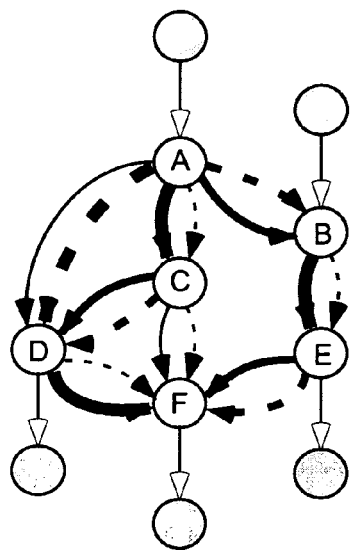
FIG. 10 shows exemplary pheromone trails that can result from applying M packing agents to the augmented graph of FIG. 6.

FIG. 10 shows how the graph of FIG. 6 might look after a number of iterations in an exemplary embodiment. The thickness of the arrows in FIG. 10 corresponds to the pheromone values for each edge. The "merge" (solid) and "non-merge" (dashed) edges between nodes A and B, nodes C and D, and nodes E and F, have about equal pheromone values. The thickness of the edges between nodes A and C, nodes B and E, and nodes D and F, show that the merge edges were selected more often than the non-merge edges for these interconnections. The thickness of the edges between nodes A and D shows that the non-merge option was more often selected between these nodes.

Figure 11:
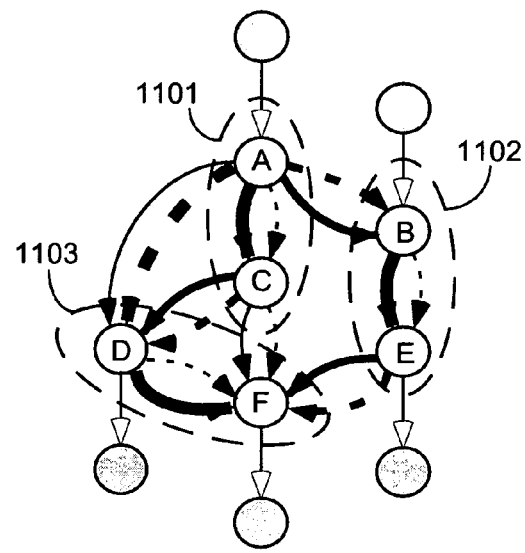
FIG. 11 shows a preferred packing implementation that can result from the pheromone trails of FIG. 10, when two nodes are packed into each larger programmable structure.

FIG. 11 shows the packing that results from the pheromone values shown in FIG. 10. Nodes A and C are packed into a first slice 1101; nodes B and E are packed into a second slice 1102; and nodes D and F are packed into a third slice 1103. Note that the nodes could equally well have been grouped into groups of more than two, depending on the architecture of the target PLD. Therefore, this packing method works equally well, for example, for slices having more than two LUTs, or for logic blocks having more than two LUTs, or for logic blocks having more than two slices, and so forth.

Figure 1:
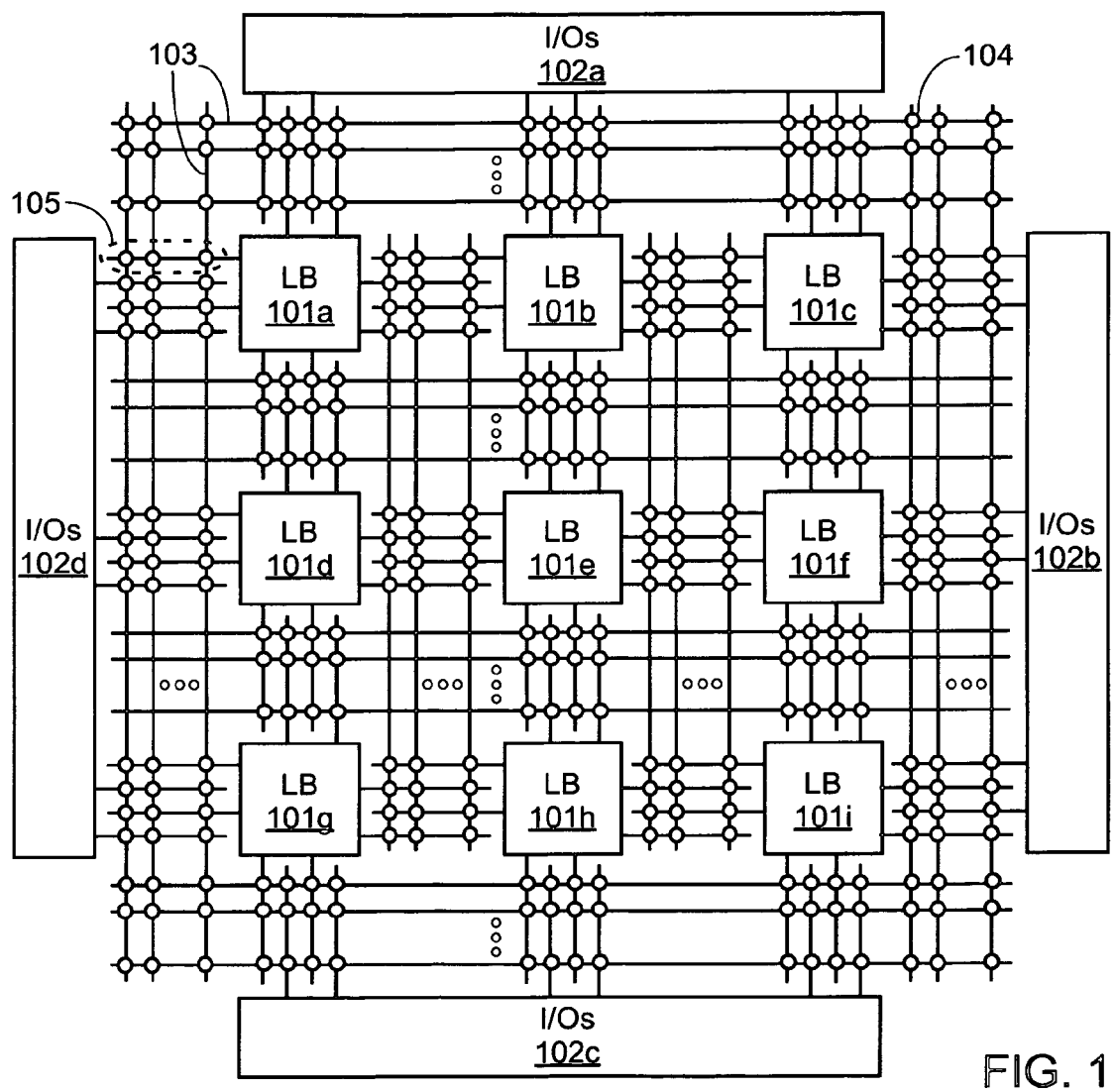
FIG. 1 shows an exemplary programmable logic device (PLD) including logic blocks interconnected by a programmable interconnect structure.
Figure 2:
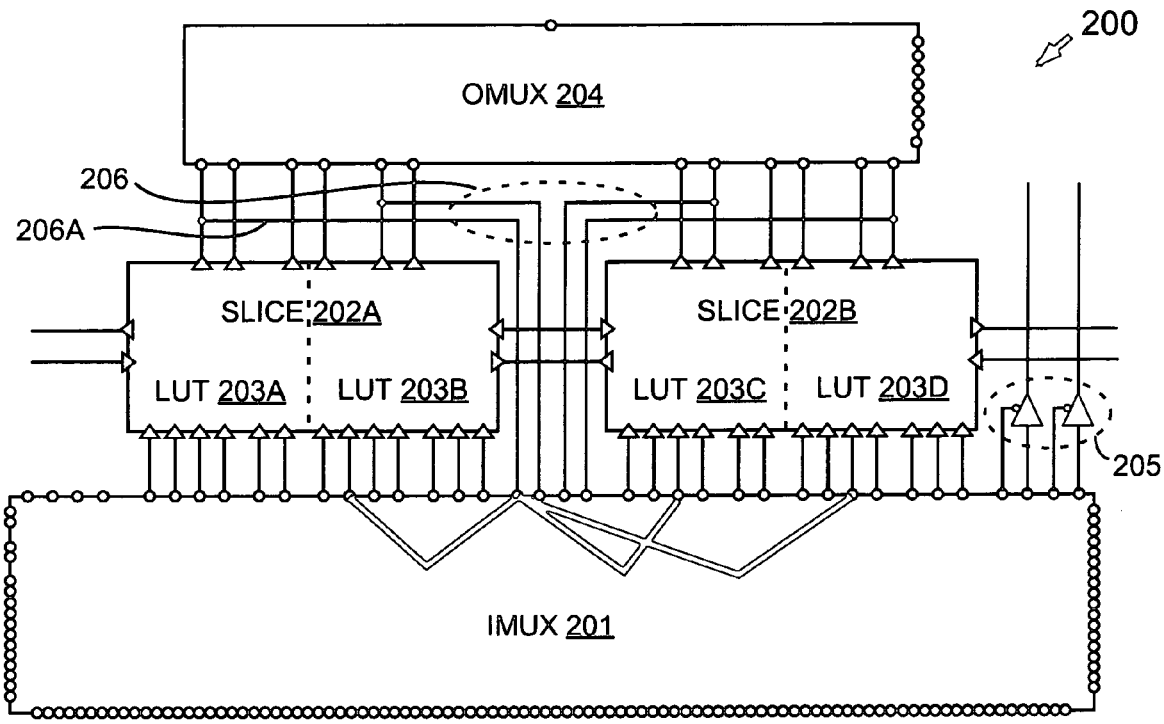
FIG. 2 shows an exemplary logic block including two slices, where each slice includes two lookup tables (LUTs).

Returning to FIG. 2, it is clear that there can be advantages not just from intelligent packing of LUTs into slices, but also from intelligent packing of slices into logic blocks, in the exemplary PLD shown in FIG. 2. For example, note that fast feedback paths are available not just within a slice, but also between slices in a single logic block. (FIG. 2 shows the fast feedback paths available from one output signal of LUT 203A.) Therefore, packing two slices on a critical path into a single logic block can result in a faster overall design, by enabling the use of fast feedback between the slices.

Figure 12:
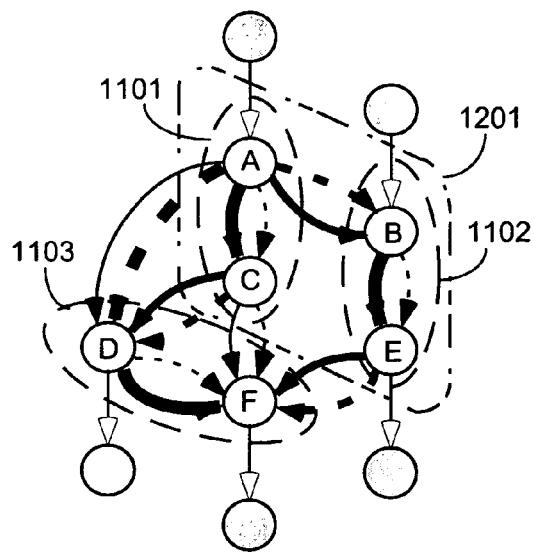
FIG. 12 shows a first packing implementation that can result from the pheromone trails of FIG. 10, when four nodes are packed into each larger programmable structure.

The graph and pheromone values shown in FIG. 10 can be further utilized to control packing of slices into logic blocks. FIG. 12 shows one way in which the slices of FIG. 11 can be packed into logic blocks. For example, if the critical path for the design associated with the graph traverses nodes A-B-E-F, packing slices 1101 and 1102 into a single logic block 1201 can provide a relatively fast implementation of the design. Note that this packing method works equally well for logic blocks having more than two slices. However, a logic block with two slices is used in the examples herein, for clarity.

Figure 13:
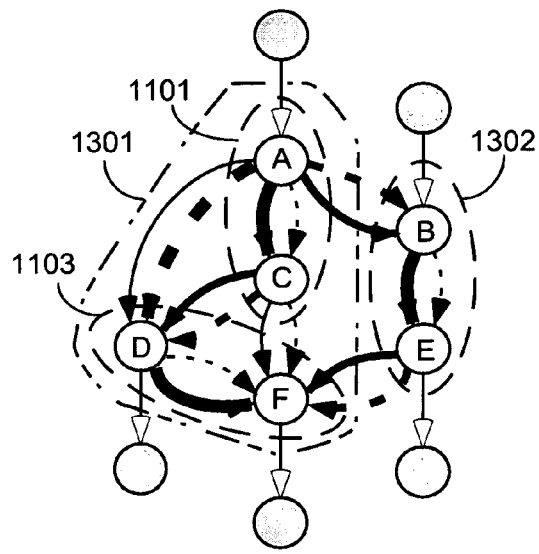
FIG. 13 shows a second packing implementation that can result from the pheromone trails of FIG. 10, when four nodes are packed into each larger programmable structure.

FIG. 12 shows a good packing implementation for slices into logic blocks where speed is the only factor taken into account in scoring. However, other factors can be taken into account, if desired, in addition to or instead of speed. For example, FIG. 13 shows a packing implementation that can result from the graph and pheromone values shown in FIG. 10 when using small amounts of routing between logic blocks is a priority. In the packing implementation of FIG. 13, slices 1101 and 1103 are packed into a single logic block 1301, and slice 1302 occupies a second logic block. Note that less routing is required between logic blocks in the implementation of FIG. 13 (two edges) than in the implementation of FIG. 12 (three edges). Therefore, depending on the probabilistic equation, this packing implementation might score higher than the packing implementation of FIG. 12.

Clearly, the most effective method of finding the best possible solution is to try every possible packing combination for the design in the PLD. However, in a design that uses hundreds or thousands of LUTs, such an approach is prohibitively time-consuming. The method shown in FIG. 5 might not find the best possible solution for a given design. However, by carefully defining the probabilistic equation, scoring algorithm, and exit criteria, the methods described herein can be used to produce packing implementations that meet the requirements of many or most designs.

Additionally, the proposed method lends itself to multi-threading. For each iteration, M packing agents traverse the graph. In embodiments where the probabilistic equation is independent of the activities of the other packing agents, each packing agent can traverse the graph independently from all of the other packing agents in the same iteration. Therefore, the process can be performed simultaneously on M different platforms. This parallelism clearly would reduce the run time of the process by a factor of about M. In some embodiments, the number of packing agents M can be changed for each iteration, if desired, based on the number of available platforms.

Many variations of the above-described process can also be used. For example, when the exit criteria are met (step 507 in FIG. 5), rather than returning the top-scoring packing implementation from the last iteration, an overall top-scoring packing implementation can be returned. This overall top-scoring packing implementation can be stored after the first iteration, maintained during successive iterations, and updated or replaced whenever an iteration results in a higher-scoring packing implementation.

As another example of a valid variation, in step 506 of FIG. 5 the pheromone values are updated based on the top-scoring packing implementation for each iteration. The process can optionally be varied by updating the pheromone values based on the best overall top-scoring packing implementation on an occasional and/or periodic basis.

Figure 3:
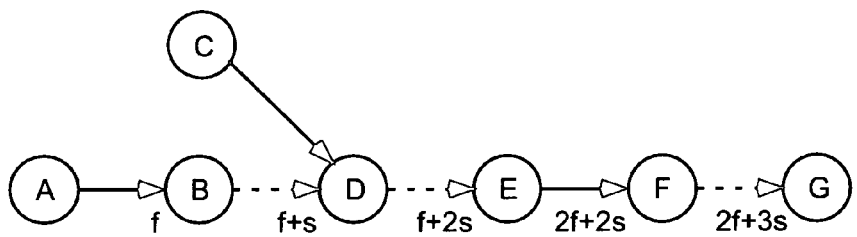
FIG. 3 shows a first packing implementation of a design in a PLD, resulting from a known packing method.
Figure 4:
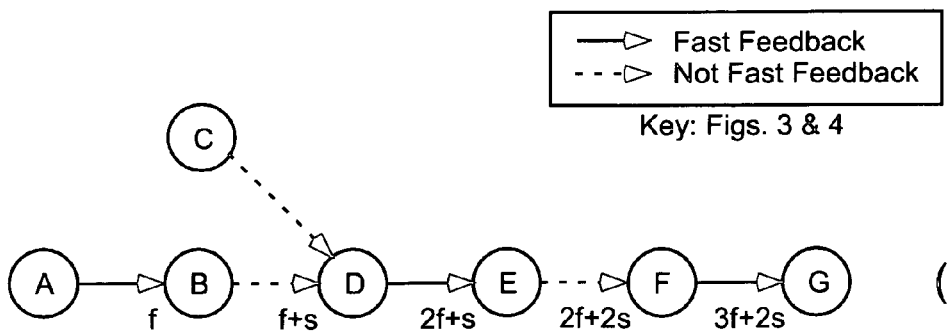
FIG. 4 shows a second packing implementation of a design in a PLD, also resulting from a known packing method.

In some embodiments, there are more than two types of edges. For example, two nodes in a graph could be connected by four different types of edges rather than two types. These edges could correspond to, for example, merged into the same slice, not merged into the same slice, merged into the same logic block, and not merged into the same logic block. In this example, the packing agents would need to select two edges for each pair of nodes, one controlling the merge/non-merge status within a slice, and one controlling the merge/non-merge status within a logic block. Note that this embodiment can be used to take advantage of fast feedback paths between slices, unlike the known method described in connection with FIGS. 3 and 4.

In some embodiments, real slack information from placement and delay estimation is incorporated into the probabilistic equation and/or the augmented graph.

In some embodiments, the number of packing agents M is a multiple or a fraction of the number of LUTs used by the design. In some embodiments, the number of packing agents M is a multiple or a fraction of the number of input and output pins and/or synchronous elements in the design.

The methods of the present invention can be performed in either hardware, software, or any combination thereof, as those terms are currently known in the art. In particular, the present methods can be carried out by software, firmware, or microcode operating on a computer or computers of any type. Additionally, software embodying the present invention can comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Further, such software can also be in the form of a computer data signal embodied in a carrier wave, such as that found within the well-known Web pages transferred among computers connected to the Internet. Accordingly, the present invention is not limited to any particular platform, unless specifically stated otherwise in the present disclosure.

Accordingly, all such modifications and additions are deemed to be within the scope of the invention, which is to be limited only by the appended claims and their equivalents.

What is claimed is:

1. A method of packing a design into a programmable logic device (PLD), the method comprising:
    defining an augmented graph and a probabilistic equation for the design, the augmented graph comprising a plurality of nodes and a plurality of edges each coupled between two of the nodes, wherein each node corresponds to a sub-circuit within the design, each edge corresponds to an interconnection between the sub-circuits corresponding to the two nodes coupled to the edge, and the nodes have a topological order;

assigning an initial pheromone value to each edge in the augmented graph;

applying M packing agents to a node occurring first in the topological order, wherein M is an integer;

generating M packing implementations of the design by, for each of the M packing agents, touring the nodes in the topological order and selecting for each node at least one edge coupled to one or more preceding nodes in the topographical order;

scoring each of the M packing implementations and identifying a top-scoring packing implementation from the M packing implementations;

updating the pheromone values for at least some of the edges in the augmented graph based on the top-scoring packing implementation; and returning, when criteria are met, the top-scoring packing implementation, wherein defining the augmented graph and the probabilistic equation for the design comprises:

defining each node in the augmented graph to correspond to one lookup table (LUT) in the PLD;

defining a first plurality of edges in the augmented graph to designate the two LUTs corresponding to the nodes coupled to each of the first plurality of edges being merged into a single slice in the PLD; and defining a second plurality of edges in the augmented graph to designate the two LUTs corresponding to the nodes coupled to each of the second plurality of edges being placed in two different slices in the PLD.

2. The method of claim 1, further comprising:

repeating, when the criteria are not met, the steps of applying, generating, scoring, and updating.

3. The method of claim 1, wherein updating the pheromone values for at least some of the edges in the augmented graph comprises increasing the pheromone value for each edge included in the top-scoring packing implementation, and decreasing the pheromone value for any edge not included in the top-scoring packing implementation.

4. The method of claim 1, wherein the probabilistic equation and the scoring are based on timing constraints for the design.

5. The method of claim 1, wherein the probabilistic equation and the scoring are based on area constraints for the design.

6. A method of packing a design into a programmable logic device (PLD), the method comprising:

defining an augmented graph and a probabilistic equation for the design, the augmented graph comprising a plurality of nodes and a plurality of edges each coupled between two of the nodes, wherein each node corresponds to a sub-circuit within the design, each edge corresponds to an interconnection between the sub-circuits corresponding to the two nodes coupled to the edge, and the nodes have a topological order;

assigning an initial pheromone value to each edge in the augmented graph;

applying M packing agents to a node occurring first in the topological order, wherein M is an integer;

generating M packing implementations of the design by, for each of the M packing agents, touring the nodes in the topological order and selecting for each node at least one edge coupled to one or more preceding nodes in the topographical order;

scoring each of the M packing implementations and identifying a top-scoring packing implementation from the M packing implementations;

updating the pheromone values for at least some of the edges in the augmented graph based on the top-scoring packing implementation; and returning, when criteria are met, the top-scoring packing implementation, wherein defining the augmented graph and the probabilistic equation for the design comprises:

defining each node in the augmented graph to correspond to one lookup table (LUT) in the PLD;

defining a first plurality of edges in the augmented graph to designate the two LUTs corresponding to the nodes coupled to each of the first plurality of edges being merged into a single logic block in the PLD; and defining a second plurality of edges in the augmented graph to designate the two LUTs corresponding to the nodes coupled to each of the second plurality of edges being placed in two different logic blocks in the PLD.

7. The method of claim 6, further comprising:

repeating, when the criteria are not met, the steps of applying, generating, scoring, and updating.

8. The method of claim 6, wherein updating the pheromone values for at least some of the edges in the augmented graph comprises increasing the pheromone value for each edge included in the top-scoring packing implementation, and decreasing the pheromone value for any edge not included in the top-scoring packing implementation.

9. The method of claim 6, wherein the probabilistic equation and the scoring are based on timing constraints for the design.

10. The method of claim 6, wherein the probabilistic equation and the scoring are based on area constraints for the design.

11. A method of packing a design into a programmable logic device (PLD), the method comprising:

defining an augmented graph and a probabilistic equation for the design, the augmented graph comprising a plurality of nodes and a plurality of edges each coupled between two of the nodes, wherein each node corresponds to a sub-circuit within the design, each edge corresponds to an interconnection between the sub-circuits corresponding to the two nodes coupled to the edge, and the nodes have a topological order;

assigning an initial pheromone value to each edge in the augmented graph;

applying M packing agents to a node occurring first in the topological order, wherein M is an integer;

generating M packing implementations of the design by, for each of the M packing agents, touring the nodes in the topological order and selecting for each node at least one edge coupled to one or more preceding nodes in the topographical order;

scoring each of the M packing implementations and identifying a top-scoring packing implementation from the M packing implementations;

updating the pheromone values for at least some of the edges in the augmented graph based on the top-scoring packing implementation; and returning, when criteria are met, the top-scoring packing implementation, wherein defining the augmented graph and the probabilistic equation for the design comprises:
- defining each node in the augmented graph to correspond to one slice in the PLD, each slice including a plurality of lookup tables (LUTs);
- defining a first plurality of edges in the augmented graph to designate the two slices corresponding to the nodes coupled to each edge being merged into a single logic block in the PLD; and
- defining a second plurality of edges in the augmented graph to designate the two slices corresponding to the nodes coupled to each edge being placed in two different logic blocks in the PLD.

12. The method of claim 11, further comprising:
repeating, when the criteria are not met, the steps of applying, generating, scoring, and updating.

13. The method of claim 11, wherein updating the pheromone values for at least some of the edges in the augmented graph comprises increasing the pheromone value for each edge included in the top-scoring packing implementation, and decreasing the pheromone value for any edge not included in the top-scoring packing implementation.

14. The method of claim 11, wherein the probabilistic equation and the scoring are based on timing constraints for the design.

15. The method of claim 11, wherein the probabilistic equation and the scoring are based on area constraints for the design.

* * * * *